(12) United States Patent
Athanassiadis

(10) Patent No.: US 7,222,204 B2
(45) Date of Patent: May 22, 2007

(54) TESTING THE INTERRUPT PRIORITY LEVELS IN A MICROPROCESSOR

(76) Inventor: Harry Athanassiadis, 51 Chopin Rd., Basingstoke RG22 4JN (GB)

( * ) Notice: Subject to any disclaimer, the term of this patent is extended or adjusted under 35 U.S.C. 154(b) by 191 days.

(21) Appl. No.: 10/293,901

(22) Filed: Nov. 12, 2002

(65) Prior Publication Data
US 2003/0120975 A1 Jun. 26, 2003

(30) Foreign Application Priority Data
Nov. 12, 2001 (GB) .................................. 0127144.4

(51) Int. Cl.
*G06F 13/24* (2006.01)
*G06F 13/26* (2006.01)
(52) U.S. Cl. ..................... 710/264; 710/260; 710/261
(58) Field of Classification Search ................ 710/260, 710/261, 264
See application file for complete search history.

(56) References Cited

U.S. PATENT DOCUMENTS

| | | | |
|---|---|---|---|
| 4,734,882 A | 3/1988 | Romagosa | |
| 5,822,595 A * | 10/1998 | Hu | 710/264 |
| 5,894,578 A | 4/1999 | Qureshi et al. | |
| 6,081,867 A * | 6/2000 | Cox | 710/264 |
| 6,098,144 A * | 8/2000 | De Oliveira et al. | 710/269 |
| 6,167,479 A | 12/2000 | Hartnett et al. | |
| 6,269,419 B1 * | 7/2001 | Matsuyama | 710/269 |
| 6,499,078 B1 * | 12/2002 | Beckert et al. | 710/260 |
| 6,581,119 B1 * | 6/2003 | Maeda et al. | 710/260 |
| 6,618,780 B1 * | 9/2003 | Popat | 710/264 |
| 6,813,666 B2 * | 11/2004 | Joffrain | 710/264 |
| 6,820,155 B1 * | 11/2004 | Ito | 710/262 |
| 6,993,685 B2 | 1/2006 | Ramaswamy et al. | |
| 2002/0112107 A1 * | 8/2002 | Joffrain | 710/264 |

* cited by examiner

*Primary Examiner*—Mark H. Rinehart
*Assistant Examiner*—Christopher Daley
(74) *Attorney, Agent, or Firm*—Klarquist Sparkman LLP

(57) ABSTRACT

A method of testing the priority levels of the interrupt sources of a microprocessor having a number of interrupt sources which are each operable to execute an interrupt service routine when enabled, each interrupt source having a default priority level and an associated memory, the interrupt sources having a service order in which they are to be serviced, the method comprising the steps of: (a) sorting the interrupt sources in descending service order; (b) determining an array of priority levels to be assigned in a pre-arranged sequence to selections of interrupts in descending service order; (c) incrementing a global counter; (d) assigning the array of priority levels to a selected group of interrupts, the remainder of the interrupts assuming their pre-assigned priority level; (e) enabling all interrupts simultaneously except the interrupt source having the highest priority level so that the interrupt having the second highest priority level executes its interrupt service routine; (f) transferring the value of the global counter into the memory of the interrupt executing its interrupt service routine; (g) enabling all interrupts simultaneously including the interrupt source having the highest priority level; (h) incrementing the global counter; (i) transferring the value of the global counter into the memory of the interrupt source executing its interrupt service routine; (j) repeating steps (c) to (i) until the pre-arranged sequence is completed and (k) comparing the interrupt memory values after completion of the pre-arranged sequence with expected values and determining from the comparison whether there is an error in the priority levels of the interrupt sources.

20 Claims, 2 Drawing Sheets

| ie13 | ie12 | ie11 | ie10 | ie9 | ie8 | ie7 | ie6 | ie5 | ser | tf1 | ie1 | tf0 | ie0 |
|---|---|---|---|---|---|---|---|---|---|---|---|---|---|

| 0 | 1 | 2 | 3 | 2 | 1 | 0 |  |
|---|---|---|---|---|---|---|---|

Priority Window

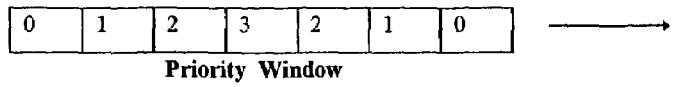

FIGURE 2b

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     | 0   | 1   | 2   | 3   | 2   | 1   | 0   |     |     |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     | 0   | 1   | 2   | 3   | 2   | 1   | 0   |     |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     | 0   | 1   | 2   | 3   | 2   | 1   | 0   |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     | 0   | 1   | 2   | 3   | 2   | 1   | 0 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     | 0   | 1   | 2   | 3   | 2   | 1 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     |     | 0   | 1   | 2   | 3   | 2 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     |     |     | 0   | 1   | 2   | 3 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     |     |     |     | 0   | 1   | 2 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     |     |     |     |     | 0   | 1 |

| ie13 | ie12 | ie11 | ie10 | ie9 | ie8 | ie7 | ie6 | ie5 | ser | tf1 | ie1 | tf0 | ie0 |
|------|------|------|------|-----|-----|-----|-----|-----|-----|-----|-----|-----|-----|
|      |      |      |      |     |     |     |     |     |     |     |     |     |     | 0 |

TESTING THE INTERRUPT PRIORITY LEVELS IN A MICROPROCESSOR

CROSS REFERENCE TO RELATED APPLICATION

This application claims priority from U.K. Patent Application No. 0127144.4, filed Nov. 12, 2001.

FIELD OF THE INVENTION

This invention relates to a method of testing the interrupt priority levels in a microprocessor and more particularly to a method of testing the interrupt priority levels in a microprocessor having interrupt sources with one or more priority levels.

BACKGROUND

An interrupt is a break in the normal flow of instruction processing in a central processing unit triggered by a hardware signal from an external or internal source. Typically, a microprocessor will have a plurality of interrupt sources each of which can be enabled or triggered to execute an interrupt service routine. Each of the interrupt sources of the microprocessor has an assignable priority level which is typically set by default.

When two interrupts are enabled, the interrupt with the highest priority level should initiate its interrupt service routine. The interrupts also have a service order so that if two interrupts having the same highest priority level are enabled, the interrupt being first in the service order initiates its interrupt service routine.

It is necessary to ensure that not only do the interrupt sources themselves correctly function but also to check that a higher priority interrupt will interrupt a lower priority interrupt—a priority test. Typically, microprocessor products did not have many priority levels for the respective interrupt sources. However, there is now a trend to use more priority levels so there is a need to establish an effective test to determine whether the priority levels are being correctly interpreted by the interrupt controls.

SUMMARY

Accordingly, it is an object of the present invention to seek to provide a method of testing the priority levels of the interrupt sources in a microprocessor having interrupts with a plurality of priority levels.

Accordingly, one aspect of the present invention provides a method of testing the priority levels of the interrupt sources of a microprocessor having a number of interrupt sources which are each operable to execute an interrupt service routine when enabled, each interrupt source having a default priority level and an associated memory, the interrupt sources having a service order in which they are to be serviced, the method comprising the steps of:

(a) sorting the interrupt sources in descending service order;

(b) determining an array of priority levels to be assigned in a pre-arranged sequence to selections of interrupts in descending service order;

(c) incrementing a global counter;

(d) assigning the array of priority levels to a selected group of interrupts, the remainder of the interrupts assuming their pre-assigned priority level;

(e) enabling all interrupts simultaneously except the interrupt source having the highest priority level so that the interrupt having the second highest priority level executes its interrupt service routine;

(f) transferring the value of the global counter into the memory of the interrupt executing its interrupt service routine;

(g) enabling all interrupts simultaneously including the interrupt source having the highest priority level;

(h) incrementing the global counter;

(i) transferring the value of the global counter into the memory of the interrupt source executing its interrupt service routine;

(j) repeating steps (c) to (i) until the pre-arranged sequence is completed and (k) comparing the interrupt memory values after completion of the pre-arranged sequence with expected values and determining from the comparison whether there is an error in the priority levels of the interrupt sources.

Preferably, the array of priority levels is assigned to a first group of interrupts and then subsequently to other groups of interrupts in descending service order.

Conveniently, the first assignment of the array of priority levels to a selected group of interrupts comprises assigning the highest priority level in the array to the interrupt being last in the service order.

Advantageously, the step of masking the highest priority level interrupt is effected to prevent enablement thereof in step c).

Preferably, subsequent repetitions of step (d) assign the first of the priority levels of the array to the next interrupt in descending service order until the first priority level of the array has been assigned to every interrupt, thereby marking the end of the pre-arranged sequence.

Conveniently, the array of priority levels comprises the full range of priority levels ascending from the lowest priority level to the highest priority level and then descending to the lowest priority level.

Advantageously, there are four priority levels: 3; 2; 1; and 0, 3 being the highest priority level and 0 being the lowest priority level, the array of priority levels comprising: 0;1; 2;3:2;1;0.

Preferably, the global counter has an initial value of 0 and steps c) and h) of incrementing the global counter each comprise the step of incrementing the global counter by one.

Conveniently, the microprocessor has 14 interrupts with 4 priority levels, 17 repetitions of steps c) to i) being required to complete the sequence.

Preferably, the pre-arranged sequence requires at least the highest priority level in the array to be assigned to each of the interrupts in descending service order.

Another aspect of the present invention provides a method of testing the priority levels of the interrupt sources of a microprocessor having a number of interrupt sources which are each operable to execute an interrupt service routine when enabled, each interrupt source having a default priority level, the interrupt sources having a service order in which they are to be serviced, the method comprising the steps of:

(a) sorting the interrupt sources in a service order;

(b) determining an array of priority levels to be assigned in a pre-arranged sequence to selections of interrupts;

(c) assigning the array of priority levels to a selected group of interrupts;

(d) enabling all interrupts simultaneously except the interrupt source having the highest priority level so that the interrupt having the second highest priority level executes its interrupt service routine;

(e) enabling all interrupts simultaneously including the interrupt source having the highest priority level; and (f) repeating steps (c) to (e) until the pre-arranged sequence is completed.

Preferably, the method comprises the further step of comparing the interrupt memory values after completion of the pre-arranged sequence with expected values and determining from the comparison whether there is an error in the priority levels of the interrupt sources.

In order that the present invention may be more readily understood, embodiments thereof will now be described, by way of example, with reference to the accompanying drawings.

BRIEF DESCRIPTION OF DRAWINGS

FIG. 1 is a schematic representation of the interrupt sources of a microprocessor and a priority window for use with a method embodying the present invention; and FIGS. 2a and 2b schematically shows seventeen steps in a priority level test methodology embodying the present invention.

DETAILED DESCRIPTION

Referring to FIG. 1, the interrupt sources of a microprocessor are shown schematically. The microprocessor has a plurality of interrupt sources, each of which can be enabled to cause an interrupt service routine to be executed. Only the interrupt sources of the microprocessor are shown. In this example, there are fourteen interrupt sources labelled: ie13, ie12, ie11, ie10, ie9, ie8, ie7, ie6, ie5, ser, tf1, ie1, tf0, ie0.

Each of the interrupts can be assigned with a priority level. In this example, the highest priority level is 3 and the lowest priority level is 0. The interrupts also have a service order, i.e. an order in which the interrupts will be serviced in the event that there is more than one interrupt with a highest priority level. This configuration is shown below in the Table.

TABLE

| Interrupts: | ie13 | ie12 | ie11 | ie10 | ie9 | ie8 | je7 | ie6 | ie5 | ser | tf1 | ie1 | tf0 | ie0 |
|---|---|---|---|---|---|---|---|---|---|---|---|---|---|---|
| Default Priority level: | 0 | 0 | 0 | 0 | 0 | 0 | 0 | 0 | 0 | 0 | 0 | 0 | 0 | 0 |
| Service Order | 14 | 13 | 12 | 11 | 10 | 9 | 8 | 7 | 6 | 5 | 4 | 3 | 2 | 1 |

The priority levels assigned to the respective interrupts in combination with the service order determine the order in which the interrupt service routines for the respective interrupts would be executed upon enablement of one or more of the interrupts. Thus, in normal operation of the microprocessor, if two interrupts are triggered, one having a higher priority level than the other, then the interrupt with the highest priority level will execute its associated interrupt service routine. Further, if an interrupt is executing its interrupt service routine and another interrupt of higher priority level is enabled, then the higher priority level interrupt should interrupt the lower priority level interrupt. In addition, if one interrupt is executing its interrupt service routine and another interrupt of the same priority level is enabled but that interrupt source is earlier in the service order, then the interrupt source earlier in the service order interrupts the interrupt source having the same priority level but being later in the service order.

It should be noted that the interrupt sources are arranged schematically in FIG. 1, in order of descending service order, the interrupts on the right-hand side being first in the service order. In the present example, all the interrupts have the same default priority level of zero.

The present invention introduces the concept of a priority window—also shown in FIG. 1. A priority window is a set or array of assignable priority levels covering the respective priority levels which can be attributed to the interrupts and which are assigned to a group of interrupts. In the present example, the priority window comprises an array of seven priority levels: 0; 1; 2; 3; 2; 1; and 0.

In accordance with a test methodology embodying the present invention, the priority levels specified in the priority window are applied in a predetermined sequence to the interrupts of the microprocessor so as to override the default priority levels which the interrupts would otherwise adopt. The priority window is applied to the interrupts at a series of predetermined locations and in a predetermined order.

Each of the interrupt sources has an associated memory or flag. A global counter is also provided and is operable to transfer its value at a given time to one of the interrupt flags.

A test methodology embodying the present invention operates in the following manner as illustrated in FIG. 2 which shows 17 steps in the test methodology.

In the first step, the interrupt sources are shown in descending service order, the interrupt source which is first, ie0, in the service order being on the far right hand-side and the interrupt source which is last (fourteenth) in the service order, being the left most interrupt source, ie13. A priority window embodying the present invention is also shown in step 1 of FIG. 2. As described earlier, in this example, there are 4 priority levels assignable to any one of the interrupt sources, 3 being the highest priority level and the 0 being the lowest. The priority window, or array of priority levels, comprises seven discrete priority levels which are respectively intended to be assigned to selected ones of a group of interrupt sources. The array of priority levels comprises the full range of priority levels ascending from the lowest priority level 0 to the highest priority level 3 and then descending to the lowest priority level 0, i.e. the array comprises the priority levels: 0; 1; 2; 3; 2; 1; and 0.

The steps in FIG. 2 schematically show the priority window being applied to the interrupt sources. In this regard, the test methodology is, of course, configured as a software routine and is best illustrated graphically in the sequential steps shown in FIG. 2.

The priority window or array of priority levels is applied to a selected group of interrupt sources—in the first instance, the highest priority level in the array is assigned to the interrupt source having the lowest service order, the next priority level in the array is provided to the next interrupt source in descending service order and so on. Thus, the priority levels assigned to the interrupt sources are altered from their default values (0) for those interrupt sources to which the priority window is applied.

Once the priority levels have been assigned to this selected group of interrupts (and the remainder of the interrupts maintain their default priority levels), then the interrupt source which has the highest priority level is identified and masked. Subsequently, all the interrupts are enabled simultaneously with the exception of the masked interrupt source having the highest priority level. The unmasked interrupt source then having the second highest priority level is the only interrupt source which executes its interrupt service routine. Upon execution of its interrupt service routine, the interrupt flag for the interrupt executing its interrupt service routine is written with the value of the global counter.

The global counter has an initial value of 0 which is incremented by 1 before all the interrupts (except that having the highest priority level) are enabled. Thus, in the first step shown in FIG. 2, the value of 1 from the global counter is transferred into the interrupt flag for interrupt ie12 since this has the second highest priority level as assigned by the array of priority levels.

Whilst the interrupt service routine for the second highest priority level interrupt source is being executed, the masked interrupt source is unmasked, the global counter is incremented by one and all the interrupt sources, including the now unmasked interrupt source are enabled. If the interrupt sources are functioning correctly, then the newly unmasked interrupt will interrupt the service routine of the interrupt having the second highest priority level and execute its own interrupt service routine. Again, the value of the global counter is transferred into the interrupt flag for the interrupt executing its service routine, in this case, the value 2 is transferred into the interrupt flag for the interrupt source is ie13.

The above-mentioned steps comprise the steps of a first loop which is then repeated following re-assignment of the priority levels. Priority levels are reassigned by moving the array of priority levels along one, so that in step 2 of FIG. 2, the highest priority level in the array is now applied to the next interrupt source in descending service order, that is interrupt ie12.

The sequence of steps applying the array of priority levels to selected groups of the interrupts in descending service order continue until the final step (step 17) in which the last of the priority levels in the array is assigned to the first interrupt source in the service order. This marks the end of the pre-arranged sequence.

Throughout these loops, the value of the global counter is transferred into the memory of the interrupt which executes its interrupt service routine at each of the steps, i.e twice in each loop, once for the second highest priority level interrupt source and then again in the same loop for the newly unmasked interrupt source having the highest priority level. Thus, as the priority window "slides" down the interrupt sources in descending service order, the respective interrupt flags provide a map in the form of the global counter counts stored therein of the performance of the interrupt priority levels. At the end of the pre-arranged sequence shown in FIG. 2, the interrupt flags of the respective interrupts hold the following values:

| Interrupt | Interrupt Flag Value |
|---|---|
| ie13 | 2 |
| ie12 | 4 |
| ie11 | 6 |
| ie10 | 8 |
| ie9 | 10 |
| ie8 | 12 |
| ie7 | 14 |
| ie6 | 16 |
| ie5 | 18 |
| ser | 20 |
| tf1 | 22 |
| ie1 | 24 |
| tf0 | 31 |
| ie0 | 32 |

The table above represents a map for a microprocessor in which the interrupt controls are working correctly. Thus, microprocessors can be tested using the above-mentioned methodology and a map or signature for that microcontroller will be produced, comprised of the values of the respective interrupt flags. That map can then be compared with a map of expected values (equivalent to that shown above) or produced from another correctly functioning microprocessor and, if there is any deviation from the expected values, then this is an indication that there is an error in the microprocessor interrupt controls. The microprocessor is failed and either discarded or subjected to debugging.

It will be appreciated that the example of the 14 interrupt source microprocessor disclosed above requires only 17 steps to construct the interrupt priority level flag map thereby significantly improving on the test methodology by reducing the number of test cycles which are necessary to test the interrupts at their respective possible priority levels. The above-mentioned test provides a high confidence level for the correct functionality of the interrupt controls and therefore a viable test methodology.

Other arrays of priority levels can be used and applied to the interrupt sources in a predetermined sequence to provide a map which shows that the interrupt controls are working correctly in a microprocessor. The array or priority window disclosed above: 0; 1; 2; 3; 2; 1; 0 is particularly advantageous because at any one time there are at least two interrupt sources which have been assigned the same priority levels so that, at each stage of the test, the test is checking which of the same priority levels would be enabled first, thereby checking the correct application of the service order.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of testing priority levels of the servicing of interrupt sources of a microprocessor having a number of interrupt sources which are each operable to execute an interrupt service routine when enabled, each interrupt source having a default priority level and an associated memory, the interrupt sources having a service order in which they are to be serviced, the method comprising the steps of:

(a) sorting the interrupt sources in descending service order;

(b) determining a priority window comprising an array of priority levels to be assigned in a pre-arranged sequence to selections of interrupts in descending service order;

(c) incrementing a global counter;

(d) assigning the array of priority levels to a selected group of interrupts, the remainder of the interrupts assuming their default priority level;

(e) enabling all interrupts simultaneously except the interrupt source having the highest priority level so that the interrupt having the second highest priority level executes its interrupt service routine unless two or more of the interrupts each have the same highest priority level, in which event the interrupt having a highest service order executes its interrupt service routine;

(f) transferring the value of the global counter into the memory of the interrupt executing its interrupt service routine;

(g) enabling all interrupts simultaneously including the interrupt source having the highest priority level;

(h) incrementing the global counter;

(i) transferring the value of the global counter into the memory of the interrupt source executing its interrupt service routine;

(j) repeating steps (c) to (i) to the next selected group of interrupts until the pre-arranged sequence is completed; and (k) comparing the interrupt memory values after completion of the pre-arranged sequence with expected values and determining from the comparison whether there is an error in the priority levels of the interrupt sources.

2. A method according to claim 1, wherein the array of priority levels is assigned to a first group of interrupts and then subsequently to other groups of interrupts in descending service order.

3. A method according to claim 2, wherein a first assignment of the array of priority levels to a selected group of interrupts comprises assigning the highest priority level in the array to the interrupt being last in the service order.

4. A method according to claim 1, comprising the step of masking the highest priority level interrupt to prevent enablement thereof in step (c).

5. A method according to claim 4, wherein subsequent repetitions of step (d) assign the first of the priority levels of the array to the next interrupt in descending service order until the first priority level of the array has been assigned to every interrupt, thereby marking the end of the pre-arranged sequence.

6. A method according to claim 1, wherein the array of priority levels comprises the full range of priority levels ascending from the lowest priority level to the highest priority level and then descending to the lowest priority level.

7. A method according to claim 1, wherein there are four priority levels: 3; 2; 1; and 0, 3 being the highest priority level and 0 being the lowest priority level, the array of priority levels comprising: 0;1;2;3:2;1;0.

8. A method according to claim 1, wherein the global counter has an initial value of 0 and steps (c) and (h) of incrementing the global counter each comprise the step of incrementing the global counter by one.

9. A method according to claim 1, wherein the microprocessor has 14 interrupts with 4 priority levels, 17 repetitions of steps (c) to (i) being required to complete the sequence.

10. A method according to claim 1, wherein the pre-arranged sequence requires at least the highest priority level in the array to he assigned to each of the interrupts in descending service order.

11. A method of testing the priority levels of the servicing of interrupt sources of a microprocessor having a number of interrupt sources which are each operable to execute an interrupt service routine when enabled, each interrupt source having a default priority level, the interrupt sources having a service order in which they are to be serviced, the method comprising the steps of:

(a) sorting the interrupt sources in a service order;

(b) determining a priority window comprising a plurality of priority levels to be assigned in a pre-arranged sequence to selections of interrupts;

(c) incrementing a global counter;

(d) assigning the plurality of priority levels to a selected group of interrupts;

(e) enabling all interrupts simultaneously except the interrupt source having the highest priority level so that the interrupt having the second highest priority level executes its interrupt service routine unless two or more of the interrupts each have the same highest priority level, in which event an interrupt having a highest service order executes an associated interrupt service routine;

(f) transferring the value of the global counter into the memory of the interrupt executing its interrupt service routine;

(g) enabling all interrupts simultaneously including the interrupt source having the highest priority level;

(h) repeating steps (c) to (e) to the next selected group of interrupts until the pre-arranged sequence is completed; and (i) comparing the interrupt memory values after completion of the pre-arranged sequence with expected values and determining from the comparison whether there is an error in the plurality of priority levels of the interrupt sources.

12. A method, comprising:

(a) sorting a plurality of interrupts in a service order;

(b) determining a priority window comprising an array of priority levels to he assigned in a pre-arranged sequence to selections of interrupts, wherein the array of priority levels comprises a full range of priority levels ascending from a lowest priority level to a highest priority level and then descending to the lowest priority level;

(c) incrementing a global counter;

(d) assigning the priority window to a selected group of interrupts;

(e) enabling all interrupts simultaneously except the interrupt source having the highest priority level in the priority window so that the interrupt having the second highest priority level in the priority window executes its interrupt service routine unless two or more of the interrupts each have the same highest priority level, in which event an interrupt having a highest service order executes an associated interrupt service routine;

(f) transferring the value of the global counter into the memory of the interrupt executing its interrupt service routine;

(g) enabling all interrupts simultaneously including the interrupt source having the highest priority level in the priority window;

(h) repeating steps (c) to (e) to the next selected group of interrupts until the pre-arranged sequence of priority levels is completed; and (i) comparing the interrupt memory values after completion of the pre-arranged sequence of priority levels with expected values and determining from the comparison whether there is an error in the priority levels of the interrupts.

13. A method according to claim 11, wherein the array of priority levels is assigned to a first group of interrupts and then subsequently to other groups of interrupts in descending service order.

14. A method according to claim 11, wherein a first assignment of the array of priority levels to a selected group of interrupts comprises assigning the highest priority level in the array to the interrupt being last in the service order.

15. A method according to claim 11, comprising the step of masking the highest priority level interrupt to prevent enablement thereof in step (e).

16. A method according to claim 11, wherein subsequent repetitions of step (d) assign the first of the priority levels of the array to the next interrupt in descending service order until the first priority level of the array has been assigned to every interrupt, thereby marking the end of the pre-arranged sequence.

17. A method according to claim 11, wherein the array of priority levels comprises the full range of priority levels ascending from the lowest priority level to the highest priority level and then descending to the lowest priority level.

18. A method according to claim 11, wherein the global counter has an initial value of 0 and steps (c) and (h) of incrementing the global counter each comprise the step of incrementing the global counter by one.

19. A method according to claim 11, wherein the microprocessor has 14 interrupts, 17 repetitions of steps (c) to (i) being required to complete the sequence.

20. A method according to claim 11, wherein the pre-arranged sequence requires at least the highest priority level in the array to be assigned to each of the interrupts in descending service order.

* * * * *

UNITED STATES PATENT AND TRADEMARK OFFICE
CERTIFICATE OF CORRECTION

PATENT NO. : 7,222,204 B2
APPLICATION NO. : 10/293901
DATED : May 22, 2007
INVENTOR(S) : Harry Athanassiadis It is certified that error appears in the above-identified patent and that said Letters Patent is hereby corrected as shown below:

In the Claims:

Column 8, line 3, "to he" should read --to be--.
Column 8, line 44, "to he" should read --to be--.

Signed and Sealed this

Twenty-seventh Day of November, 2007

JON W. DUDAS
*Director of the United States Patent and Trademark Office*